US009958881B2

(12) United States Patent
Draber et al.

(10) Patent No.: US 9,958,881 B2
(45) Date of Patent: May 1, 2018

(54) SINGLE-CONTROL THERMOSTATIC CARTRIDGE

(71) Applicant: VERNET, Ollainville (FR)

(72) Inventors: Matthieu Draber, Milly la Foret (FR); William Da Silva, Ollainville (FR)

(73) Assignee: VERNET, Ollainville (FR)

( * ) Notice: Subject to any disclaimer, the term of this patent is extended or adjusted under 35 U.S.C. 154(b) by 33 days.

(21) Appl. No.: 15/026,073

(22) PCT Filed: Oct. 3, 2014

(86) PCT No.: PCT/EP2014/071269
§ 371 (c)(1),
(2) Date: Jun. 1, 2016

(87) PCT Pub. No.: WO2015/052098
PCT Pub. Date: Apr. 16, 2015

(65) Prior Publication Data
US 2016/0266587 A1   Sep. 15, 2016

(30) Foreign Application Priority Data
Oct. 7, 2013 (FR) ...................... 13 59701

(51) Int. Cl.
G05D 23/13 (2006.01)
F23D 5/14 (2006.01)
G05D 23/185 (2006.01)
F27D 19/00 (2006.01)
F24D 19/10 (2006.01)

(52) U.S. Cl.
CPC ....... G05D 23/132 (2013.01); G05D 23/1353 (2013.01)

(58) Field of Classification Search
CPC .................... G05D 23/132; G05D 23/1353
USPC .......... 237/8 A; 236/12.1, 12.16, 12.11, 12.2
See application file for complete search history.

(56) References Cited

U.S. PATENT DOCUMENTS 5,927,597 A *  7/1999  Bolgar .............. G05D 23/1353
                                                137/625.17
7,617,989 B2   11/2009 Caleffi
7,744,007 B2 *  6/2010  Beagen ................ G05D 23/134
                                                137/337

(Continued)

FOREIGN PATENT DOCUMENTS

CN   201 787 132 U   4/2006
EP     1 496 415 A2  1/2005
(Continued)

OTHER PUBLICATIONS

International Search Report dated Nov. 4, 2014 in International Application No. PCT/EP2014/071269.

(Continued)

Primary Examiner — Henry Crenshaw
(74) Attorney, Agent, or Firm — Knobbe, Martens, Olson & Bear, LLP

(57) ABSTRACT

A cartridge with a controller for controlling cold and hot fluid flows to form a mixture, a slide valve for controlling a mixture temperature, a thermostatic element that controls a position of the slide valve along an axis, and a single handle for controlling the mixture flow and temperature, which is movably mounted to actuate and drive the controller and move the thermostatic element along the axis.

13 Claims, 3 Drawing Sheets

(56) References Cited

U.S. PATENT DOCUMENTS

| | | | |
|---|---|---|---|
| 8,074,893 B2 | 12/2011 | Vernet | |
| 8,740,097 B2 | 6/2014 | Vernet | |
| 2004/0200987 A1* | 10/2004 | Houghton | E03C 1/052 251/295 |
| 2008/0035744 A1* | 2/2008 | Mace | G05D 23/1353 236/12.2 |
| 2008/0093470 A1 | 4/2008 | Qingjun | |
| 2009/0000026 A1* | 1/2009 | Hanson | E03C 1/04 4/695 |
| 2009/0001178 A1* | 1/2009 | Jarvis | F16K 11/074 236/12.11 |
| 2009/0308940 A1* | 12/2009 | Green | G05D 23/1353 236/12.11 |
| 2009/0314844 A1* | 12/2009 | Mace | G05D 23/1353 236/12.1 |
| 2010/0123014 A1* | 5/2010 | Beagen | F16K 31/002 236/12.2 |
| 2010/0314457 A1* | 12/2010 | Todaka | F16K 11/07 236/12.16 |
| 2011/0042468 A1* | 2/2011 | Lee | F24D 3/1066 236/12.1 |
| 2011/0240155 A1* | 10/2011 | Platet | G05D 23/1353 137/605 |
| 2012/0061483 A1* | 3/2012 | Lee | E03B 1/04 237/8 A |
| 2016/0266587 A1* | 9/2016 | Draber | G05D 23/132 |

FOREIGN PATENT DOCUMENTS

| | | |
|---|---|---|
| EP | 1 672 257 A1 | 6/2006 |
| FR | 2 801 690 A1 | 6/2001 |
| GB | 2 460 878 A | 12/2009 |
| WO | WO 96-26475 A1 | 8/1996 |
| WO | WO 2013-083703 A1 | 6/2013 |

OTHER PUBLICATIONS

French Search Report dated Jun. 30, 2014 in French Application No. FR 1359701.

* cited by examiner

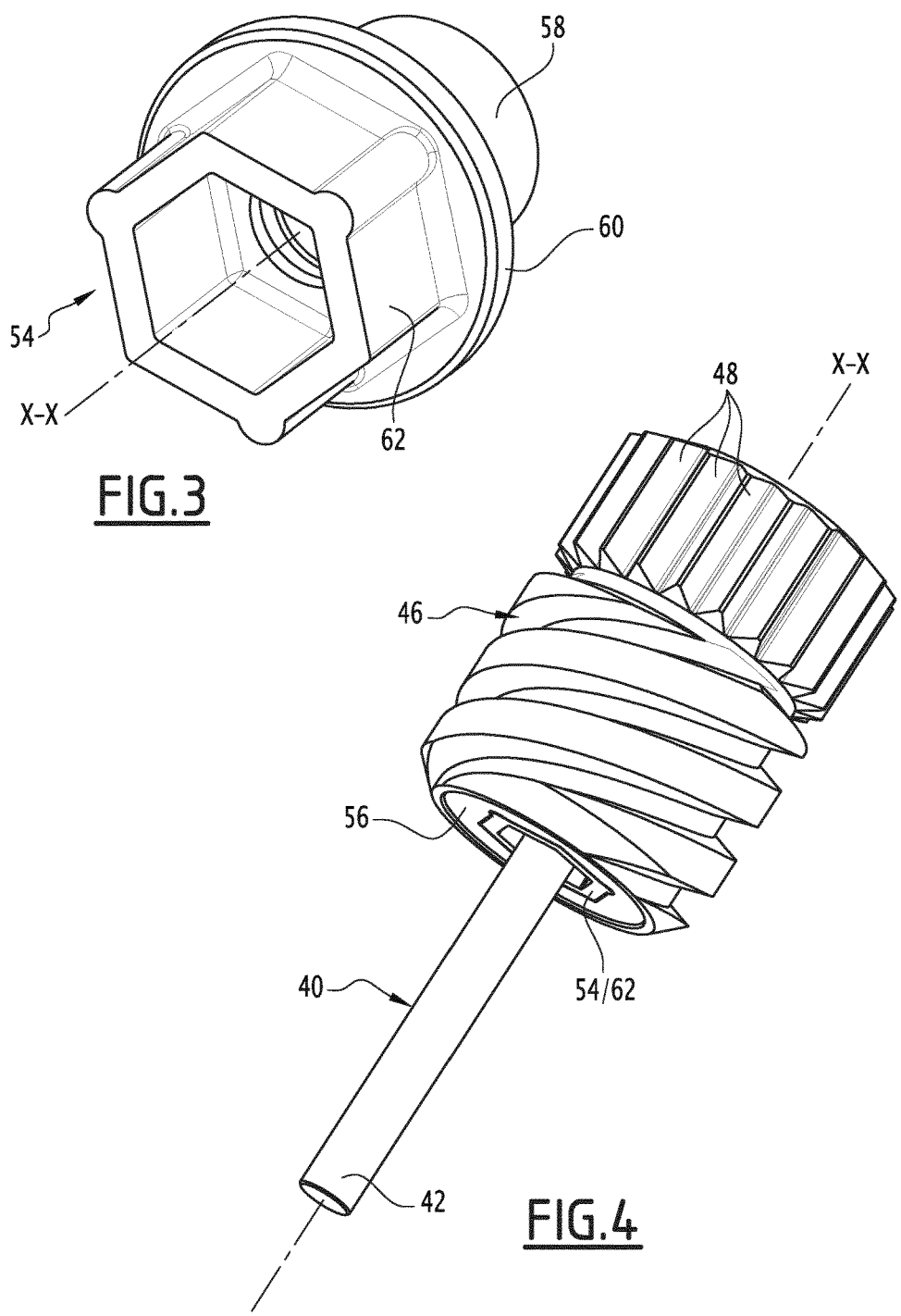

SINGLE-CONTROL THERMOSTATIC CARTRIDGE

CROSS REFERENCE TO RELATED APPLICATIONS

This application is the U.S. National Phase Application under 35 U.S.C. § 371 of International Application No. PCT/EP2014/071269, filed Oct. 3, 2014, designating the U.S. and published as WO 2015/052098 A1 on Apr. 16, 2015, which claims the benefit of French Patent Application No. FR 1359701, filed Oct. 7, 2013. Any and all applications for which a foreign or a domestic priority is claimed is/are identified in the Application Data Sheet filed herewith and is/are hereby incorporated by reference in their entirety under 37 C.F.R. § 1.57.

BACKGROUND

The present invention relates to a single-control thermostatic cartridge.

In the sanitation field, a cartridge is a device making it possible to regulate hot and cold fluids to be mixed, in particular hot water and cold water. In a thermostatic cartridge, the regulation is obtained using a thermostatic element that comprises a first part that is normally stationary relative to a hollow base of the cartridge on the one hand, and a second part that is movable along an axis relative to the first part under the action of the expansion of a thermo-expansive material of the thermostatic element and that is secured to a regulating slide valve on the other hand. This slide valve is movable along the axis inside the base of the cartridge, so as to inversely vary the flow sections of the hot and cold fluids, supplying the base through a first of its axial sides, in order to mix those two fluids in variable proportions to obtain, downstream from the slide valve, a fluid, called "blended fluid", "mixture" or "mixed fluid", that flows along a heat-sensitive region of the thermostatic element and leaves the base through its second axial side. By modifying the position of the first part of the thermostatic element relative to the base, using an ad hoc control mechanism, the thermostatic regulation temperature is set, i.e., the equilibrium temperature around which the temperature of the mixture is regulated. This type of cartridge incorporates discs or functionally similar elements to control the cold and hot fluid flow rates, sent toward the slide valve: these discs are mounted inside a cover fixed to the base, while being arranged overhanging the first axial side of the base, and are supplied with the cold and hot fluids via flow channels of those fluids extending from the second axial side of the base to the first axial side of the base. It is even possible to have only a single handle, carried movably by the aforementioned cover, to control both these adjusting discs for the flow rate and the aforementioned control mechanism: in that case, the thermostatic cartridge is described as single-control. WO-A-96/26475 and WO-A-2010/072966 provide examples of this.

In the case of WO-A-2010/072966, the control mechanism includes a control rod, which acts axially on the thermostatic element to modify its position along the axis relative to the base and on which a control screw acts axially, locked in rotation around the axis and screwed in a control nut connected to the handle in rotation: in other words, rotating the handle around the axis actuates a screw-nut system, formed by the aforementioned control screw and control nut, which translates the thermostatic element axially in one direction, with the understanding that, in the opposite direction, the thermostatic element is kept bearing axially against the control screw under the action of a return spring. The cartridge of WO-A-2010/072966 further incorporates an overtravel spring, which is stiffer than the return spring and which is designed to be compressed only during a deployment of the thermostatic element such that the slide valve abuts axially against a resistant surface of the base, in order to avoid damaging the slide valve and/or that of the thermostatic element. This overtravel spring is typically compressed when the supply of the cartridge with cold fluid is cut, in order to provide the user with protection against being burned by the hot water. The overtravel spring is inserted axially between the control rod and the control screw, while being housed inside this control screw to gain compactness.

In the case of WO-A-96/26475, a functionally similar overtravel spring is also provided, but while being axially inserted between a control rod and a compression plate of the spring, screwed, during the assembly of the cartridge, inside a control pin, which is mounted rotatably-translatably on the base by a threaded connection and that is connected in rotation around the axis of the handle. In other words, the control mechanism of WO-A-96/26475 is less sophisticated than that of WO-A-2010/072966. Furthermore, in one of the embodiments of WO-A-96/26475, it is provided to arrange the overtravel spring inside a fine adjustment bush, which is screwed inside the control pin: it then becomes possible, for a fixed position of the control pin, in other words, for a fixed position of the handle, to provide a fine adjustment of the position of the bush, and therefore of the overtravel spring and the control rod, along the axis in order to modify the position of the thermostatic element along the axis accordingly. In this way, it will be understood that it is possible to provide a fine adjustment of the thermostatic regulation temperature controlled by the handle, at the end of manufacturing of the cartridge or during its installation. Thus, the fine adjustment bush of WO-A-96/26475 is of technical interest, but its screwing-unscrewing inside the pin is tedious and is presence is particularly cumbersome, since this bush takes on the entire overtravel spring.

SUMMARY

The aim of the present invention is to improve the cartridge of WO-A-2010/072966 by proposing a new single-control thermostatic cartridge which, while being particularly compact, incorporates a fine adjustment function of its thermostatic regulation temperature.

To that end, the invention relates to a single-control thermostatic cartridge, including:
a body, which defines an axis and which is provided with a chamber for mixing a cold fluid and a hot fluid, in which a cold fluid intake for the cold fluid and a hot fluid intake for the hot fluid emerge, and which supplies an outlet for a mixture of the cold and hot fluids;
control means for controlling both the flow rate of the cold fluid sent to the cold fluid intake and the flow rate of the hot fluid sent to the hot fluid intake;
a slide valve for regulating the temperature of the mixture, which is movable substantially along the axis inside the chamber so as to inversely vary the respective flow sections of the cold fluid intake and of the hot fluid intake;
a thermostatic element, which is at least partially positioned in the chamber, while being substantially centered on the axis, and which is connected to the slide valve so as to control the position of the slide valve along the axis;

a handle for controlling the flow rate and the temperature of the mixture, which is single and mounted movably relative to the body so as both to actuate the control means by driving and move the thermostatic element along the axis inside the chamber, said handle being connected to the thermostatic element by:

a control nut, which rotates around the axis relative to the body and which is connected in rotation around the axis to the handle, a control screw, which is screwed inside the control nut and which is connected in rotation around the axis of the body, and a control rod, which is substantially centered on the axis, against a first axial end of which the thermostatic element is axially pressed, and whereof a second axial end, opposite the first end, is axially bearing against the control screw with an interposition of an overtravel spring; and a fine adjustment mechanism which connects the second end of the control rod to the control screw, against which the overtravel spring bears axially, and which is suitable so as, while the handle is fixed in rotation around the axis relative to the body, to modify the position of the control rod along the axis relative to the control screw so as to adjust the position of the thermostatic element along the axis, without modifying the position of the overtravel spring relative to the body.

One of the ideas at the base of the invention is to incorporate, compactly and easily to use, a fine adjustment mechanism for the thermostatic regulation temperature in a sophisticated cartridge of the type proposed in WO-A-2010/072966. According to the invention, a fine adjustment mechanism is designed both to be inserted mechanically between the control rod and the control screw that belong to the mechanical connection between the control handle of the cartridge and its thermostatic element, and to be biased without modifying the mechanical configuration of the overtravel spring of the cartridge. In other words, with respect to the overtravel spring, the presence and action of the fine adjustment mechanism according to the invention have no mechanical effect, inasmuch as, when the overtravel spring is biased, typically so as to provide a burn protection effect, the mechanical behavior of this overtravel spring is the same irrespective of the adjustment configuration of the fine adjustment mechanism. This means that the single-control thermostatic cartridge according to the invention combines a fine adjustment function and an overtravel function, while mechanically separating the implementation of these two functions. As a result, the cartridge is more reliable, the fine adjustment mechanism can be provided to be particularly compact, and the implementation of the latter, in order to adjust the thermostatic regulation temperature, can be done easily and quickly, without disrupting the other components of the cartridge, interacting with the control handle.

According to additional features of the single-control thermostatic cartridge according to the invention:

the fine adjustment mechanism comprises a fine adjustment nut:

inside which the second end of the control rod is screwed, against which the overtravel spring bears axially, which is connected in rotation around the axis to the control screw, and which is movable along the axis relative to the control screw under the antagonistic actions of the decompression of the overtravel spring and the deployment of the thermostatic element;

the control screw is hollow and inwardly delimits a housing that receives the overtravel spring, the fine adjustment nut and the second end of the control rod;

the housing extends over the entire axial dimension of the control screw, except at the axial end of the control screw, which is turned opposite the thermostatic element and at which the control screw includes a wall for closing the housing, against which the overtravel spring bears axially;

the fine adjustment mechanism further includes a fine adjustment ring:

which is fixedly secured to the control screw, which is connected in rotation around the axis to the fine adjustment nut, and inside which the fine adjustment nut is movably mounted along the axis;

the control screw is hollow and inwardly delimits a housing that receives the overtravel spring, the fine adjustment nut and the second end of the control rod;

the housing of the control screw also receives the fine adjustment ring;

the overtravel spring and the fine adjustment nut are received completely inside a housing of the control screw and a retained therein by the fine adjustment ring;

the housing extends over the entire axial dimension of the control screw, except at the axial end of the control screw, which is turned opposite the thermostatic element and at which the control screw includes a wall for closing the housing, against which the overtravel spring bears axially;

the fine adjustment nut successively includes, along the axis:

a first axial part, which is inwardly provided with a tapping for screwing-unscrewing the second end of the control rod, a second axial part, which is axially interposed between the overtravel spring and the fine adjustment ring, and a third axial part that cooperates by shape matching with the fine adjustment ring so as both to connect them to one another in rotation around the axis and to guide a translation of the fine adjustment nut along the axis relative to the fine adjustment ring;

the second end of the control rod has an engagement cavity for engaging a driving tool for rotating the control rod around itself around the axis, and wherein a wall of the control screw, arranged axially across from the engagement cavity, is provided with a through hole for axial passage for said driving tool from the outside of the single-control thermostatic cartridge;

the control screw is provided with a removable part for closing off the through hole;

the control screw is outwardly provided with ribs oriented along the axis, which are received in complementary slots delimited by the body so as to lock the control screw in rotation around the axis.

BRIEF DESCRIPTION OF THE DRAWINGS

The invention will be better understood upon reading the following description, provided solely as an example and done in reference to the drawings, in which:

FIGS. 3 and 4 are perspective views of components, shown in isolation, belonging to the cartridge of FIG. 1.

DETAILED DESCRIPTION

Figure 1:
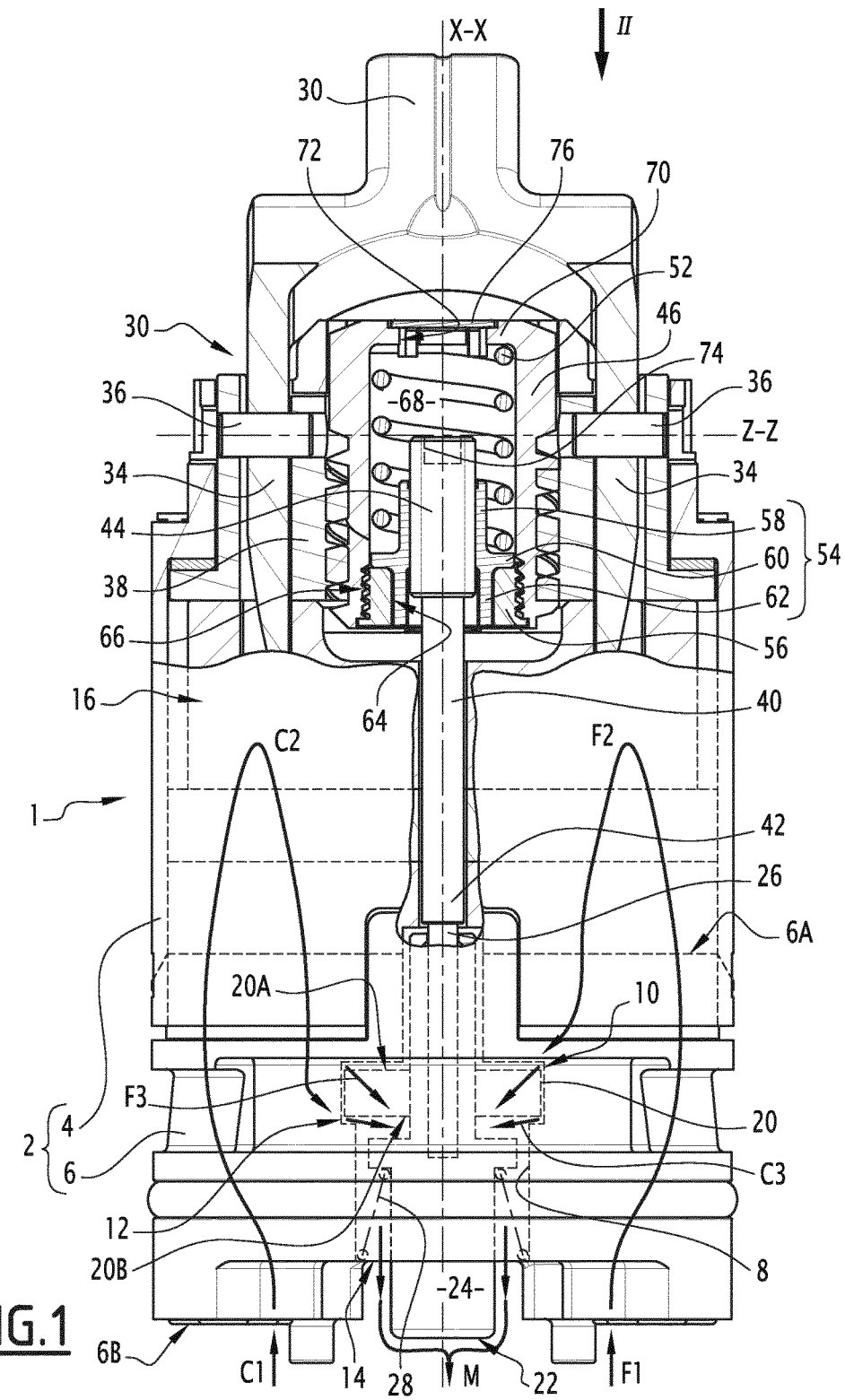
FIG. 1 is a partial longitudinal sectional view of a single-control thermostatic cartridge according to the invention.
Figure 2:
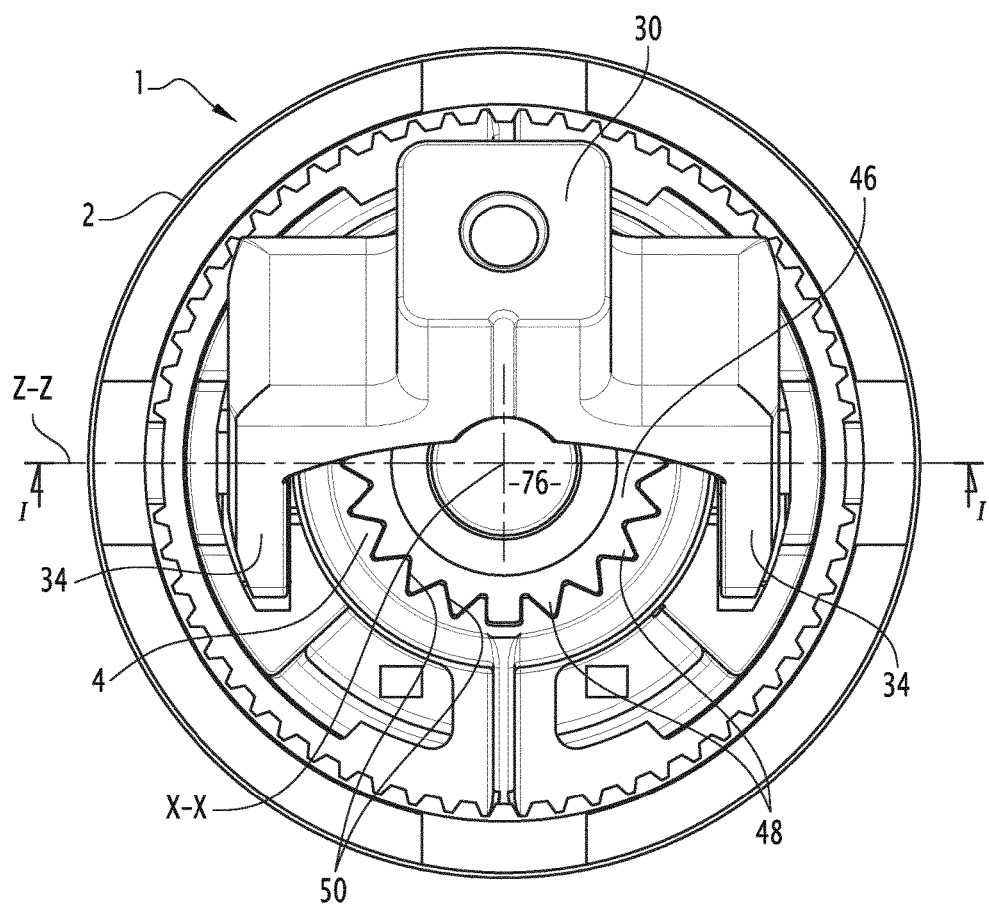
FIG. 2 is an elevation view along arrow II of FIG. 1, the cutting plane of the latter being denoted I-I in FIG. 2.

FIGS. 1 and 2 show a single-control thermostatic cartridge 1 that is arranged around and along a central axis X-X. This cartridge 1 is suitable for equipping a faucet mixing hot water and cold water, not shown in the figures, or more generally, to equip a sanitation facility.

For convenience, the rest of the description is oriented relative to the axis X-X, considering that the terms "upper" and "top" correspond to an axial direction turned toward the upper part in FIG. 1, while the terms "lower" and "bottom" correspond to an axial direction in the opposite sense.

The thermostatic cartridge 1 includes a body 2, which defines the axis X-X, which is stationary when the cartridge 1 is in use, and which includes an upper cover 4 and a lower base 6 which, in the assembled state of the cartridge, are fixedly assembled to one another, using any appropriate means. The cover 4 and the base 6 each have a globally cylindrical outer shape, centered on the axis X-X and with a circular base.

In a manner known in itself and not shown in detail in FIG. 1, the base 6 allows, via inner channels, a flow of cold water and a flow of hot water over its entire axial dimension, the cold water and hot water thus flowing from the lower side 6B of the base 6 to the upper side 6A of the base. As shown only in dotted lines in FIG. 1, the base 6 defines an inner chamber 8, which is substantially centered on the axis X-X', as well as a cold water intake 10 and a hot water intake 12 that emerge in the chamber 8. During use, the lower side 6B of the base 6 is supplied with cold water and hot water, as respectively indicated by arrows F1 and C1 in FIG. 1. Additionally, after having flowed through the base 6 to its upper side 6A, then having flowed inside the cover 4 is respectively indicated by arrows F2 and C2, this cold water and hot water are turned back, from the inside of the cover 4 toward the upper side 6A of the base 6, so as to respectively supply the intakes 10 and 12, which, in turn, supply the chamber 8, as indicated by the arrows F3 and C3. Inside the chamber 8, the cold water and hot water mix in the form of mixed water, then, as indicated by arrow M in FIG. 1, this mixture of mixed water is discharged from the chamber 8 via an outlet 14, which is centered on the axis X-X and places the chamber 8 in free fluid communication with the outside of the base 6, while emerging on the inner side 6B of the latter.

In order to make it possible to send, in a controlled manner, all or part of the cold water and hot water supplying the lower side 6B of the base 6 to the intakes 10 and 12, the cartridge 1 includes an assembly 16 of superimposed ceramic discs, which are designed to control the cold water flow rate sent to the intake 10 and the hot water flow rate sent to the intake 12, based on the relative position of these discs. According to another traditional embodiment, at least one of the discs of the assembly 16 is movable relative to at least one other of the discs of that assembly, so as, by relative movement of the discs, to modify the placement in fluid communication between the orifices delimited in these discs. Such an assembly 16 including two discs is commercially available. Furthermore, as an example, WO-A-2010/072966 provides a detailed description of one possible embodiment, not limiting with respect to this invention, including three discs, the reader being able to refer to that document if applicable. More generally, control assemblies other than the disc assembly 16 can be used in the cartridge 1, inasmuch as those assemblies make it possible to control the cold water and hot water flow rates respectively sent to the intakes 10 and 12, while being able to be actuated by the user of the cartridge, as described in more detail below.

The cartridge 1 also includes a slide valve 20 making it possible to regulate the temperature of the mixed water. In a manner known in itself, and as shown in FIG. 1 in dotted lines only, this slide valve 20 has a globally tubular shape, centered on an axis which, in the assembled state of the cartridge, is aligned with the axis X-X. Consequently, for convenience, the rest of the description of the slide valve 20 is oriented relative to the axis X-X.

The slide valve 20 is mounted on the body 2, more specifically inside the chamber 8 of its base 6, movably along the axis X-X between two extreme positions, i.e.:

an extreme upper position, in which the upper face 20A of the slide valve 20 bears against an upper seat, which is stationary relative to the body 2 and which is, for example, defined by the base 6 or by a piece integral with the base, so as to close off the cold water intake 10, and an extreme low position, in which the lower face 20B of the slide valve 20 is bearing against a lower seat, which is stationary relative to the body 2 and which is, for example, defined by the base 6 or by a part integral with that base, so as to close off the hot water intake 12.

Inasmuch as the total axial dimension of the slide valve 20, separating its opposite faces 20A and 20B from one another, is smaller than the axial distance separating one of the aforementioned upper and lower seats from the other, it will be understood that, when the slide valve 20 is in its extreme lower position, the slide valve completely closes the hot water intake 12 while maximally opening the cold water intake 10, whereas, conversely, when the slide valve is in its extreme upper position, it completely closes the cold water intake while maximally opening the hot water intake. Of course, depending on the position of the slide valve 20 along the axis X-X between these extreme upper and lower positions, respective flow sections of the cold water intake 10 and hot water intake 12 vary inversely, which effectively means that the quantities of cold water and hot water admitted inside the chamber 8 are regulated, in inverse respective proportions, by the slide valve 20 depending on its axial position. In FIG. 1, the slide valve 20 occupies an intermediate axial position between the extreme upper and lower positions.

In practice, it will be noted that, for the cold water admitted into the chamber 8 by the intake 10 to be able to join and mix with the hot water admitted into the chamber by the intake 12, to then form the mixed water flowing, from downstream of the slide valve 20, to the outlet 14, the slide valve inwardly delimits one or more flow passages, not shown in FIG. 1 and connecting its opposite faces 20A and 20B to one another. The shape of these flow passages is not limiting with respect to the present invention and will therefore not be described in more detail here.

In order to drive the axial movement of the slide valve 20 and thus control its position along the axis X-X, the cartridge 1 also includes a thermostatic element 22 whereof the body 24, which is centered on the axis X-X in the assembled state of the cartridge, is fixedly secured to the slide valve 20, using any appropriate means. A heat-sensitive part of this body 24 contains a thermo-expansive material which, under the action of the heat from the mixture of hot water and cold water, flowing from downstream of the slide valve 20 along this heat-sensitive part of the body 24, expands and causes the relative translational movement along the axis X-X, of a piston 26 of the thermostatic element 22, this piston 26 also being substantially centered on the axis X-X in the assembled state of the cartridge 1. The thermostatic element 22 is further associated with a compressed return spring 28 that acts on the body 24 of the thermostatic element 22, and therefore on the slide valve 20 secured to the body 24, opposite the deployment of the piston 26 outside the body 24, resulting from an expansion of the aforementioned thermo-expansive material. The return spring 28 is axially interposed between the body 2 and the slide valve 20, more specifically, in the example embodiment considered in the figures, between the base 6 and the body 24 of the thermostatic element 22, such that, during a contraction of the aforementioned thermo-expansive material, the spring 28 partially relaxes and returns the piston 26 to the inside of the body 24.

The cartridge 1 further includes a single control handle 30 for the flow rate and temperature of the mixed water leaving the cartridge 1 via the outlet 14. This handle 30 is mounted on the cover 4 of the body 2 of the cartridge, by means of a control mechanism 32 that is designed, under the action of the handle driven by a user of the cartridge 1, to actuate the assembly of discs 16 by driving, while moving the thermostatic element 22 along the axis X-X inside the chamber 6.

In the example embodiment considered in the figures, the control mechanism 32 includes, in order to control the actuation by driving of the assembly of discs 16, two parallel arms 34 that rigidly extend the handle 30 downward, giving the latter a fork shape. The arms 34 cooperate mechanically with the assembly of discs 16 such that tilting the handle 30 around an axis Z-Z, extending in a direction radial to the axis X-X, drives the movement of one of the discs of the assembly 16 relative to the other of these discs so as to modify the flow rate of the mixture resulting from the cold water sent to the intake 10 and the hot water sent to the intake 12 by the assembly of discs 16, without significantly modifying the respective portions of the hot water and the cold water within the mixture. To that end, in the example embodiment considered here, the arms 34 are mounted pivoting around the axis Z-Z on respective pins 36 that are both supported by a nut 38 belonging to the control mechanism 32, these pins 36 thus allowing the arms 34 to tilt around the axis Z-Z relative to the nut 38, while connecting the arms 34 and the nut 38 in rotation around the axis Z-Z. The nut 38 is, in turn, mounted rotatably around the axis X-X inside the cover 4: in this way, the rotation of the handle 30 around the axis X-X by the user drives both the arms 34 and the nut 38 in a corresponding rotational movement, these arms and/or this nut then driving the corresponding rotation of one or two discs of the set 16 so as to increase one of the cold water and hot water flow rates, sent to the intakes 10 and 12, respectively, by the set 16, relative to the other of those flow rates, in addition to the mobility of the handle 30 by tilting around the axis Z-Z. As an example of a more specific embodiment, the reader may refer to WO-A-2010/072966, while stressing that other embodiments can be considered regarding the part of the control mechanism 32 allowing the handle 30 to actuate, by driving the assembly of discs 16, or more generally, the control means of the cold water and hot water flow rates respectively sent to the intakes 10 and 12.

For the purpose of replacing the thermostatic element 22 along the axis X-X, the control mechanism 32 includes a rod 40, which is centered on the axis X-X and which extends in the axial upward extension of the piston 26 of the thermostatic element 22. More specifically, the rod 40 includes a lower axial end 42 against which the piston 26 is axially pressed, more specifically the upper free end of this piston, under the effect of the return spring 28: it will be understood that the cooperation by upward axial bearing between the piston 26 and the rod 40 determines the axial altitude of this piston relative to the body 2 of the cartridge 1, independently of its relative position with respect to the body 24 of the thermostatic element 22.

Axially opposite its lower end 42, the rod 40 includes an upper end 44 which, by means of developments that will be outlined later, bears axially against a screw 46, belonging to the control mechanism 32, centered on the axis X-X and received screwed inside the complementary central tapping of the nut 38: this screw 46 being locked in rotation relative to the body 2 of the cartridge 1 using any appropriate means, it will be understood that it forms, with the nut 38, a "screw-nut" system that mechanically converts a rotational movement of the axis X-X of the nut 38 into a translational movement along the axis of the screw 46, this translational movement being transmitted by axial bearing to the rod 40 and therefore to the piston 26 of the thermostatic element 22. It will therefore be understood that, when the handle 30 is rotated around itself around the axis X-X, the corresponding rotation of the nut 38 drives, in addition to the movement of at least one of the discs of the assembly of discs 16, the translation along the axis X-X of the screw 46, the rod 40 and the thermostatic element 22. In practice, the pitch of the screw-nut system formed by the nut 38 and the rod 40 is adapted to allow both the adjustment of the temperature of the mixed water by the assembly of discs 16 and the corrective regulation of the temperature by the slide valve 20 controlled in position by the thermostatic element 22, so as to impose a desired temperature on the mixed water, which is for example identified by a graduated ring, not shown in the figures, attached on the outer face of the body 2.

According to one particularly advantageous arrangement, the screw 46 is immobilized in rotation around the axis X-X relative to the body 2 by means of ribs 48 provided on the outer side face of the screw, as clearly shown in FIG. 4. These ribs 48 are oriented in the direction of the axis X-X. During the assembly of the cartridge 1, these ribs are respectively received in complementary slots 50, defined by the cover 4 of the body 2 of the cartridge. These ribs 48 and these slots 50 thus cooperate by shape matching to connect the screw 46 and the cover 4 in rotation directly to one another around the axis X-X, as clearly shown in FIG. 2. This arrangement improves the compactness of the cartridge, in particular since no additional part is necessary to lock the rotation of the screw 46 relative to the body 2 of the cartridge.

The cartridge 1 also includes a compressed overtravel spring 52 which, in the assembled state of the cartridge, is mounted axially compressed between the screw 46 and the upper end 44 of the rod 40. In other words, this overtravel screw 52 is mechanically interposed, in the direction of the axis X-X, between the screw 46 and the rod 40: in a manner known in itself, this overtravel spring has a greater stiffness than that of the return spring 28, typically a stiffness twice that of the return spring 28, such that, when the slide valve 20 is movable inside the chamber 8 freely, i.e., without axially abutting against a resistant surface, the overtravel spring 52 rigidly transmits the axial forces between the rod 40 and the screw 46, whereas, in case of overtravel of the piston 26 while the slide valve 20 axially abuts against a resistant surface, preventing it from accommodating the overtravel of the piston, the overtravel spring 52 handles accommodating the overtravel of the piston 26, by compressing further under the action of the rod 40, which in turn is driven axially by the piston 26. In this way, one avoids damaging the slide valve 20 and/or the thermostatic element 22, typically when the body 24 of the latter is subjected to mixed water having a high temperature, as is the case in the event of significant or complete shutoff of the supply of the cartridge 1 with cold water. With respect to the user, the overtravel spring 52 gives the cartridge 1 a burn protection function.

The cartridge 1 further comprises a mechanism allowing a fine adjustment of the angular indexing around the axis X-X of the handle 30 with respect to the thermostatic regulation temperature. In the example embodiment considered in the figures, this fine adjustment mechanism includes a nut 54, shown alone in FIG. 3, and a ring 56, partially visible in FIG. 4, where it is shown cooperating with the nut 54. As clearly shown in FIGS. 1 and 3, the nut 54 has a tubular overall shape, which, in the assembled state of the cartridge 1, is centered on the axis X-X and which, along the axis, successively includes:

an upper axial part 58 that is inwardly tapped, an intermediate axial part 60, which forms a peripheral collar, protruding radially, and an axial part 62 having a hexagonal outer transverse contour.

The ring 56 also has a tubular overall shape, which, in the assembled state of the cartridge 1, is centered on the axis X-X. The ring 56 has an inner bore 64, the transverse profile of which is hexagonal, so as to be complementary to the outer transverse profile of the lower part 62 of the nut 54. On its outer face, the ring 56 is provided with a thread 66.

In the assembled state of the cartridge 1, the nut 54 is screwed around the upper end 44 of the rod 40, which is threaded accordingly, while advantageously being completely housed inside a housing 68 of the screw 46, which is consequently provided to be hollow. More specifically, the tapped upper part 58 of the nut 54 is screwed around a complementary thread provided on the upper end 44 of the rod 40, this end 44 thus advantageously being arranged inside the housing 68 of the screw 46, reinforcing the compactness of the cartridge 1, in particular its axial compactness, since the upper terminal part of the rod 40 is housed inside the screw 46. Of course, in practice, to make it possible to completely house the nut 54 inside the housing 68 of the screw 46, the outer transverse profile of the collar protruding radially, formed by the intermediate part 60 of this nut, is dimensioned so as not to interfere in axial abutment with the walls of this housing 68: according to one advantageous provision, one interest of which will appear later, the outer transverse profile of this collar is even adjusted on the inner transverse profile of the housing 68, as in the example embodiment considered in the figures.

Also according to one advantageous arrangement, the collar formed by the intermediate part 60 of the nut 54 is used for downward axial bearing for the lower end turn of the overtravel spring 52, this overtravel spring 52 being completely housed inside a housing 68 of the screw 46 against which the upper end turn of this overtravel spring bears either indirectly or, as in the example embodiment considered in the figures, directly, since the housing 68 is upwardly closed by a transverse wall 70 belonging to the screw 46, for example integral with the rest of this screw. It will thus be understood that the axial forces transmitted between the rod 40 and the screw 46 successively pass through the threaded connection between the upper end 44 of the rod 40 and the upper part 58 of the nut 54, through this upper part 58 of the nut, through the intermediate part 60 of the nut and through the overtravel spring 52.

In order to keep the nut 54 and the overtravel spring 52 in position with respect to the screw 46, the ring 56 is attached around the lower part 62 of the nut 54, until it forms an axial downward bearing for the collar formed by the intermediate part 60 of this nut, the ring 56 being screwed all the way on the screw 46, by cooperation between the thread 66 of the spring 56 and the downward outlet of the housing 68. Advantageously, the ring 56 is thus screwed all the way inside the housing 68, more specifically inside the axial lower terminal part of the latter, as in the example embodiment considered in the figures. The fully screwed connection between the ring 56 and the screw 46 fixedly secures the spring and the screw to one another, such that, in the assembled state of the cartridge and when the latter is in use, the screw 46 and the ring 56 mechanically behave as a single piece with respect to the other components of the cartridge 1. It will be understood that, in light of the shape matching cooperation with a hexagonal profile between the lower part 62 of the nut 54 and the bore 64 of the ring 56, the nut 54 is fixedly connected in rotation around the axis X-X with the screw 46 and therefore with the body 2 of the cartridge 1 since, as described above, the screw 46 is immobilized in rotation around the axis X-X on the cover 4 of the body 2. At the same time, still by means of the connection by shape matching with a hexagonal profile between the lower part 62 of the nut 54 and the bore 64 of the ring 56, this nut 54 remains movable along the axis X-X relative to the ring 56, while even being guided in translation, with the understanding that this movement is still upwardly possible to make it possible to over-compress the overtravel spring 52 in case of overtravel of the piston 26, as explained above, whereas, downwardly, the movement freedom of the nut 54 is constrained by the action of the overtravel spring 52, which tends to press the collar formed by the intermediate part 60 of the nut 54 against the ring 56.

Taking the preceding explanations into account, it will be understood that, in the assembled state of the cartridge 1 and even while the handle 30 is kept fixed in rotation around the axis X-X relative to the body 2, the "screw-nut" system formed by the nut 38 and the screw 46 is immobilized, while leaving the possibility of modifying the axial position of the rod 40 and, therefore, that of the thermostatic element 22, subject to setting the rod 40 in rotation on itself around the axis X-X relative to the stationary nut 54, in other words, subject to the screwing/unscrewing of this rod 40 inside the nut 54. Thus, for a given angular position of the handle 30, typically for a predetermined angular position, associated with a preset temperature value, of the handle 30 relative to the body 2 of the cartridge, the setting in rotation of the rod 40 inside the nut 54 modifies the axial altitude of the piston 26 of the thermostatic element 22, which allows a fine adjustment of this axial altitude of the piston. In practice, this fine adjustment of the thermostatic regulation temperature by the cartridge 1 is done on a dedicated bank or a similar facility, owing to which water is made to flow through the cartridge having an imposed known temperature, which is used as the temperature reference to set the position of the thermostatic element along the axis X-X.

It will be noted that the implementation, described above, of the fine adjustment mechanism, including the nut 54 and the ring 56, does not modify the position of the overtravel spring 52 relative to the body 2 of the cartridge 1 since, during this implementation, the nut 54 and the screw 46, between which the overtravel spring 52 is axially interposed, are mobile relative to the body 2. In other words, the action on the rod 40, during the implementation of the fine adjustment mechanism, does not bias the overtravel spring 52, which makes the cartridge 1 particularly reliable regarding this fine adjustment mechanism and regarding its overtravel spring. Of course, when the cartridge 1 is in use, the presence of the fine adjustment mechanism allows the bias of the overtravel spring 52, in particular to avoid burning the user.

According to one advantageous optional provision, the screwing-unscrewing of the rod 40 during the implementation of the fine adjustment mechanism is done using a tool, not shown in figures, that is passed axially, from the outside of the cartridge 1, through a through hole 72 of the wall 70 of the screw 46, until it reaches the upper end 44 of the rod 40 in the housing 68, more specifically until it reaches an engagement cavity 74 for that tool, supported by that end 44 of the rod 40. In FIG. 1, this engagement cavity 74 is indicated diagrammatically in dotted lines: as an example, this cavity has a hexagonal, multi-lobed or star-shaped profile. In all cases, this engagement cavity 74 is complementary to the distal end of the aforementioned tool for rotating the rod 40 around the axis X-X, while being situated axially across from the through hole 72, as clearly shown in FIG. 1. As an optional arrangement, the cartridge 1 is provided with a removable part 76 for closing off the through hole 72: during the implementation of the fine adjustment mechanism, this part 76 is freed, then, once the fine adjustment operation is complete, this part 76 is attached on the screw 46, from the outside of the cartridge 1, in order to close off the through hole 72, as shown in FIGS. 1 and 2.

Various arrangements and alternatives to the cartridge 1 described thus far can also be considered. As examples:

in the example embodiment considered in the figures, the housing 68 of the screw 46 advantageously extends over the entire axial dimension of this screw 46, except at the upper axial end of the latter, at which the wall 70 for closing this housing is provided, this embodiment optimizing the compactness, in particular axial, of the cartridge 1, in that the screw 46 only extends axially upward past the overtravel screw 52 from its wall 70; that being the case, as an alternative that is not shown, the screw 46 can be provided to be extended upwardly;

likewise, if one abandons reinforcing the compactness of the cartridge 1, all or part of the overtravel spring 52, the fine adjustment nut 54, the fine adjustment ring 56 and the upper end 44 of the rod 40 can be arranged outside the screw 46 and/or rather than being fixedly secured to the screw 46 by complete screwing, the fine adjustment ring 56 can be clipped or fitted-jammed with the screw 46.

The invention claimed is:

1. A single-control thermostatic cartridge, comprising:
a body, which defines an axis and which is comprised of
 a chamber configured for mixing a cold fluid and a hot fluid, in which a cold fluid intake for the cold fluid and a hot fluid intake for the hot fluid emerge, and which is configured to supply an outlet for a mixture of the cold and hot fluids;
a controller configured to control both a flow rate of the cold fluid sent to the cold fluid intake and a flow rate of the hot fluid sent to the hot fluid intake;
a slide valve configured to regulate a temperature of the mixture, which is configured to be movable substantially along the axis inside the chamber so as to inversely vary a flow section of the cold fluid intake and a flow section of the hot fluid intake;
a thermostat, which is configured to be at least partially positioned in the chamber, while being configured to be substantially centered on the axis, and which is configured to be connected to the slide valve so as to be configured to control a position of the slide valve along the axis;
a handle configured to control the flow rate and the temperature of the mixture, which is configured to be single and mounted movably relative to the body so as to be configured both to actuate the controller by driving and moving the thermostat along the axis inside the chamber, the handle being configured to be connected to the thermostat by:
a control nut configured to rotate around the axis relative to the body and which is configured to be connected in rotation around the axis to the handle,
a control screw configured to be screwed inside the control nut and which is configured to be connected in rotation around the axis of the body, and
a control rod, which is configured to be substantially centered on the axis, against a first axial end of which the thermostat is configured to be axially pressed, and whereof a second axial end, opposite the first end, is configured to axially bear against the control screw with an interposition of an overtravel spring; and
a fine adjustment mechanism which is configured to connect the second end of the control rod to the control screw, against which the overtravel spring is configured to bear axially, and which is configured to be suitable so as, while the handle is configured to be fixed in rotation around the axis relative to the body, to modify the position of the control rod along the axis relative to the control screw so as to be configured to adjust the position of the thermostat along the axis, without being configured to modify the position of the overtravel spring relative to the body.

2. The single-control thermostatic cartridge according to claim 1, wherein the fine adjustment mechanism is configured to comprise a fine adjustment nut:
inside which the second end of the control rod is configured to be screwed,
against which the overtravel spring is configured to bear axially,
which is configured to be connected in rotation around the axis to the control screw, and
which is configured to be movable along the axis relative to the control screw under the antagonistic actions of the decompression of the overtravel spring and the deployment of the thermostat.

3. The single-control thermostatic cartridge according to claim 2, wherein the control screw is configured to be hollow and inwardly delimits a housing that is configured to receive the overtravel spring, the fine adjustment nut and the second end of the control rod.

4. The single-control thermostatic cartridge according to claim 3, wherein the housing is configured to extend over the entire axial dimension of the control screw, except at an axial end of the control screw, said axial end of the control screw being configured to be remote from the thermostat and wherein the control screw is configured to include a wall for closing the housing at said axial end of the control screw, the overtravel spring being configured to bear axially against said wall.

5. The single-control thermostatic cartridge according to claim 2, wherein the fine adjustment mechanism is configured to further include a fine adjustment ring:
which is configured to be fixedly assembled to the control screw such that in use, the control screw and the fine adjustment ring mechanically behave as a single piece for the single-control thermostatic cartridge, which is configured to be connected in rotation around the axis to the fine adjustment nut, and inside which the fine adjustment nut is configured to be movably mounted along the axis.

6. The single-control thermostatic cartridge according to claim 5, wherein the control screw is configured to be hollow and inwardly delimit a housing that is configured to receive the overtravel spring, the fine adjustment nut and the second end of the control rod.

7. The single-control thermostatic cartridge according to claim 6, wherein the housing of the control screw is configured to also receive the fine adjustment ring.

8. The single-control thermostatic cartridge according to claim 6, wherein the overtravel spring and the fine adjustment nut are configured to be received completely inside a housing of the control screw and configured to be retained therein by the fine adjustment ring.

9. The single-control thermostatic cartridge according to claim 6, wherein the housing is configured to extend over the entire axial dimension of the control screw, except at an axial end of the control screw, said axial end of the control screw being configured to be remote from the thermostat, and wherein the control screw is configured to include a wall for closing the housing at said axial end of the control screw, the overtravel spring being configured to bear axially against said wall.

10. The single control thermostatic cartridge according to claim 5, wherein the fine adjustment nut is configured to successively comprise, along the axis:

a first axial part configured to be inwardly provided with a tapping for screwing-unscrewing the second end of the control rod, a second axial part configured to be axially interposed between the overtravel spring and the fine adjustment ring, and a third axial part that is configured to cooperate by shape matching with the fine adjustment ring so as to be configured both to connect the fine adjustment nut to the fine adjustment ring in rotation around the axis and to guide a translation of the fine adjustment nut along the axis relative to the fine adjustment ring.

11. The single-control thermostatic cartridge according to claim 1, wherein the second end of the control rod is configured to have an engagement cavity for engaging a driving tool configured for rotating the control rod around itself around the axis, and wherein a wall of the control screw, configured to be arranged axially across from the engagement cavity, is configured to be provided with a through hole for axial passage for the driving tool from the outside of the single-control thermostatic cartridge.

12. The single-control thermostatic cartridge according to claim 11, wherein the control screw is configured to be provided with a removable part for closing off the through hole.

13. The single-control thermostatic cartridge according to claim 1, wherein the control screw is configured to be outwardly provided with ribs oriented along the axis, which are configured to be received in complementary slots delimited by the body so as to be configured to lock the control screw in rotation around the axis relative to the body.

* * * * *